United States Patent [19]

Dowling et al.

[11] Patent Number: 4,811,890
[45] Date of Patent: Mar. 14, 1989

[54] METHOD OF ELIMINATING CORE DISTORTION IN DIFFUSION BONDED AND UPERPLASTICALLY FORMED STRUCTURES

[75] Inventors: Charles Dowling, Lawndale; Roger S. Raymond, Redondo Beach, both of Calif.

[73] Assignee: Rockwell International Corporation, El Segundo, Calif.

[21] Appl. No.: 499,050

[22] Filed: May 7, 1983

[51] Int. Cl.$^4$ .............................................. B23K 31/00
[52] U.S. Cl. ..................................... 228/157; 228/193; 228/181
[58] Field of Search ............... 228/157, 155, 181, 193, 228/200, 215, 218; 264/520, 568, 572, 573

[56] References Cited

U.S. PATENT DOCUMENTS

| | | | |
|---|---|---|---|
| 3,011,254 | 12/1961 | Melill et al. | 228/181 |
| 3,812,230 | 5/1974 | Takahashi | 264/564 |
| 3,825,641 | 7/1974 | Barnett | 264/568 |
| 3,861,847 | 1/1975 | Barnett | 264/573 |
| 3,936,920 | 2/1976 | Cohn, Jr. | 228/181 |
| 4,104,394 | 8/1978 | Okita | 264/568 |
| 4,406,393 | 9/1983 | Ascani, Jr. | 228/157 |

*Primary Examiner*—Kurt Rowan
*Attorney, Agent, or Firm*—Charles T. Silberberg; Max Geldin

[57] ABSTRACT

Method for eliminating core distortion in diffusion bonded and superplastically formed structures or panels, wherein metal blanks or workpieces of metal, capable of diffusion bonding and superplastic forming such as a titanium alloy, preferably in the form of thin sheets of the order of 0.030 inch thick or less, are placed in contact with each other in a tooling apparatus or die, the sheets are joined at selected areas by diffusion bonding and are then expanded superplastically to form a desired panel or a truss core panel structure. In such method, the metal sheets are diffusion bonded at certain preselected areas under pressure and at elevated temperature, and the unbonded areas of the sheets are then expanded by superplastic forming into contact with the walls of the tool or die cavity, at elevated temperature e.g., 1600-1650° F. and an internal gas pressure e.g., about 300 psi, to form the desired panel. Following superplastic forming and cooling, the thin cell walls of the core panel are often distorted or crushed. As a feature of the invention, following superplastic forming and release of the internal gas pressure, and during cooling of the panel and while the metal panel is still at a temperature where the metal remains flexible or plastic, e.g., 1200°-1400° F., a low internal differential gas pressure, e.g., of about 3-7 psi, is introduced into the interior of the panel, expanding the panel out to its original form against the tool or die as a restraint, and straightening the thin core cell walls of the panel which were distorted following superplastic forming.

21 Claims, 2 Drawing Sheets

METHOD OF ELIMINATING CORE DISTORTION IN DIFFUSION BONDED AND UPERPLASTICALLY FORMED STRUCTURES

BACKGROUND OF THE INVENTION

This invention relates to the diffusion bonding of metals, such as aluminum and titanium, and their alloys, and which are subsequently formed into structures such as truss core panels by superplastic forming, and is particularly concerned with the elimination of core distortion of core panel structures following superplastic forming, particularly when the core walls are relatively thin.

A number of alloys exhibit superplasticity and are capable of being subjected to superplastic forming to produce parts of predetermined shapes. Superplasticity is the capability of a material to develop unusually high tensile elongation with reduced tendency toward local necking during deformation. Prior to such superplastic forming, diffusion bonding of the metal workpieces is carried out to bond the workpieces in certain preselected areas, to permit superplastic forming to be carried out in the unbonded areas of the workpieces.

Structures have been successfully produced from a number of titanium-based alloys by the Superplastic Forming/Diffusion Bonding (SPF/DB) process. Such structures are producible because such metals or alloys exhibit the two essential physical properties required for SPF/DB, namely ability to be diffusion bonded and superplasticity.

Diffusion bonding refers to the solid-state, metallurgical joining of surfaces of similar or dissimilar metals by applying heat and pressure for a time duration so as to effect intimate surface contact and cause commingling of atoms at the joining interface.

Examples of metals which can be diffusion bonded and which have superplasticity characteristics include titanium, zirconium, refractory metals, and alloys thereof Aluminum may also be suitable for this purpose since recent developments indicate that aluminum and its alloys can be diffusion bonded, as well as being capable of superplastic forming.

U.S. Pat. No. 3,927,817 discloses a method for fabrication of structures in which metal blanks, preferably diffusion bonding at elevated temperatures and pressures, and then subjected to superplastic forming to form a desired structure. The metal blanks are first treated at selected areas with a stopoff material, such as yttria, boron nitride, graphite, or alumina to prevent bonding at such treated areas during diffusion bonding. During superplastic forming the metal blanks are expanded at the treated (unbonded) areas into contact with shaping members by increasing the internal pressure, preferably with an inert gas, thus forming an expanded structure of a desired shape, essentially in a single operation.

Thus, after the bonds between adjacent metal blanks are formed during diffusion bonding, inert gas pressure, such as argon or helium, is applied to the interior network to superplastically form the unbonded portions of the adjacent metal sheets.

U.S. Pat. No. 4,303,570 is further illustrative of the production of diffusion bonded and superplastically formed structures and techniques employed therein.

When producing truss core panels or sandwich structures, after diffusion bonding and superplastic forming of such structures, distortion or crushing of the core, particularly in cases where the core is relatively thin, e.g., of the order of 0.030 inch thick or less, generally occurs, Although such core distortion is apparently due to some external force, such as the tool itself or atmospheric pressure on the expanded core structure, the actual cause or causes of such core distortion have not been fully identified, except that it occurs during the gas evacuation or the cool-down cycle, following expansion and superplastic forming, due to pressure or thermal gradients. Instantaneous pressure gradients including the negative internal pressure caused by the cooling and contraction of internal gas, may be caused by the inability of the gases remaining in the interior of the panel structure to equalize with the ambient air through the small gas injection tube orifices in the tool. Thermal gradients may be due to the fact that since the steel tool contracts faster than, for example, the titanium alloy panel which has been diffusion bonded and superplastically formed, the tool and the panel must be slightly separated to prevent tool pressure and crushing of the titanium alloy panel core. This is often inconvenient and impractical and may require the introduction of shims or spacers between the upper tool and the upper surface of the core panel.

It is accordingly an object of the present invention to provide a process for producing structural members, particularly core panel structures, by diffusion bonding and superplastic forming, while eliminating core distortion or crushing.

Another object of the invention is the provision of core structures of the above type, wherein the thickness of the core is relatively thin, while avoiding core distortion.

A still further object of the invention is the provision of thin truss core panels by diffusion. bonding and superplastic forming, embodying a simple procedure for eliminating core distortion.

SUMMARY OF THE INVENTION

The above objects and advantages are achieved according to the invention by repressurizing the interior of the panel during the cool-down cycle. following superplastic forming, while the panel is still in the tool, to counteract the core distorting effect of either pressure or thermal gradients.

Thus, following diffusion bonding and superplastic forming of a core panel, particularly having a thin core of the order of 0.030 inch thick or less, and resulting in distortion of the core cell walls, after release of the gas pressure applied during expansion and superplastic forming, and during cooling of the panel, and while the metal of the panel remains at a sufficiently elevated temperature so that the metal forming the core of the panel is still flexible or plastic, a low internal differential gas pressure is introduced into the interior of the panel to expand the panel into its original form against the restraint of the walls of the die or tool, and straightening the distorted core cell walls of the panel.

In the case of a metal such as titanium alloy, the core is repressurized during the cool-down cycle following superplastic forming and while the metal is still at a temperature above about 1,000° F., e.g., about 1400° F., by the introduction of a low differential gas pressure, e.g., as low as 3 psi, for a relatively short period, followed by release of such internal pressure and continued cool-down of the panel, and then followed by removal of the panel from the tool, resulting in a panel or truss core panel free of core distortion.

In its broad aspects there is thus provided according to the present invention a method for eliminating core distortion in the production of core panels formed from metal workpieces of a metal capable of diffusion bonding and superplastic forming which comprises:

diffusion bonding said metal workpieces at preselected areas in a die, expanding the unbonded areas of said workpieces by superplastic forming at elevated temperature and pressure into contact with the walls of said die, and forming a core panel, and following release of said pressure and during cooling of said panel, introducing a low differential pressure into the interior of said core panel.

BRIEF DESCRIPTION OF THE DRAWING

The invention will be more readily understood by the detailed description below of a preferred embodiment taken in connection with the accompanying drawings wherein.

DETAILED DESCRIPTION OF THE INVENTION AND PREFERRED EMBODIMENT

Figure 1:
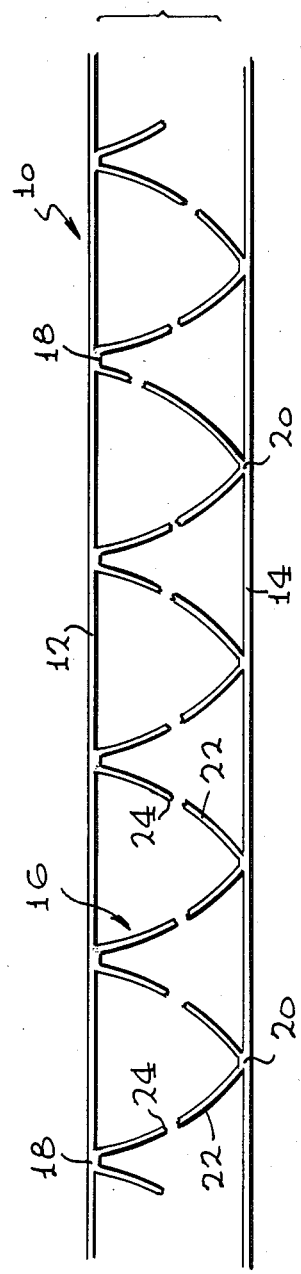
FIG. 1 illustrates a diffusion bonded/superplastically formed truss core panel having a thin core and which has been ruptured following superplastic forming in the conventional manner.

Referring to FIG. 1 of the drawing, there is shown a truss core 10 having upper and lower face sheets 12 and 14 respectively, and a core sheet 16 bonded to the upper and lower face sheets, indicated at the bonded areas 18 and 20, respectively.

The truss core 10 is formed of a metal such as a titanium alloy, and the core sheet 16 has thin core cell walls 22, of about 0.030 inch thick or less, Such truss core can be formed of any metal which is capable of diffusion bonding and superplastic forming, including, for example, titanium, aluminum, zirconium and alloys thereof.

The core sheet 10 is produced by diffusion bonding and superplastic forming, and as previously noted, after expansion and superplastic forming in the usual manner, the thin core cell walls 22 can be ruptured as indicated at 24 due to the imposition of some external force such as the tool itself, by the differential contraction between the steel tool or die, and the titanium alloy panel.

Figure 2:
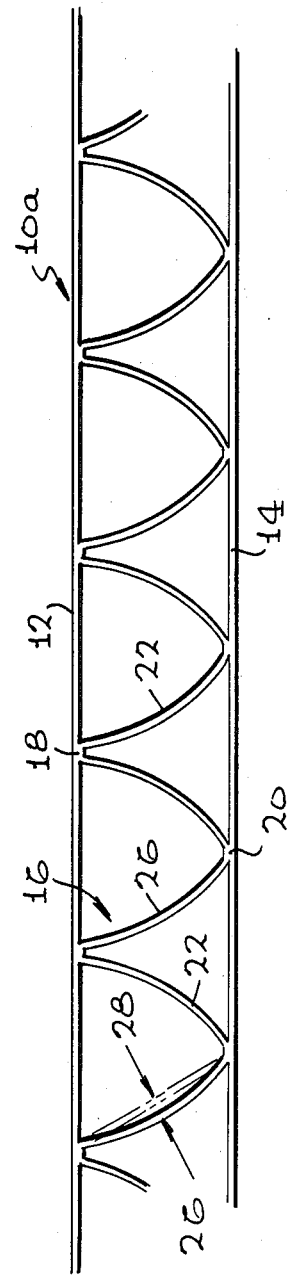
FIG. 2 illustrates a diffusion bonded/superplastically formed truss core panel having a thin core which has been subjected to core distortion following superplastic forming in the conventional manner.

Further, as illustrated in FIG. 2, in certain instances following expansion and superplastic forming of the truss core 10a, core distortion or crushing of the thin core cell walls 22 can occur by bending of the core cell walls 22, as indicated at 26, and distorting the core cell walls away from the desired straight configuration illustrated by dotted lines at 28, as a result of the above noted external forces.

Figure 3:
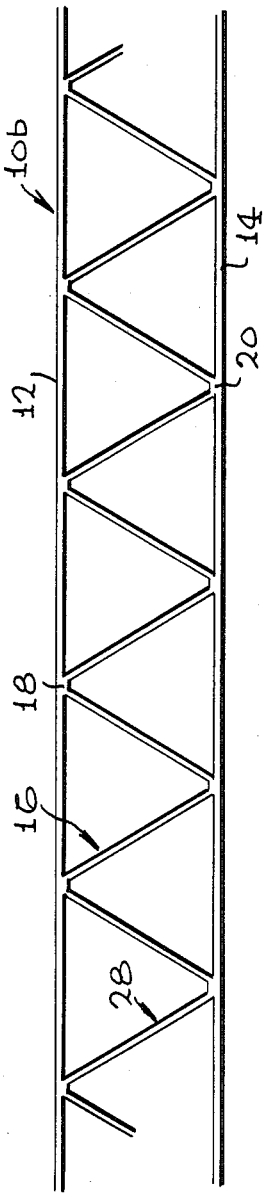
FIG. 3 illustrates a diffusion bonded/superplastically formed truss core panel having a thin core and which was subjected to internal repressurization during cooldown following superplastic forming, to eliminate core distortion according to the invention.

Referring now to FIG. 3, however, following diffusion bonding and expansion of the core sheet by superplastic forming, by repressurization of the interior of the core sheet with a low differential pressure during cooling of the superplastically formed panel or truss core, and while the core metal still remains at a sufficiently high temperature so that the metal remains flexible, such internal differential pressure is sufficient to expand the panel 10a as illustrated in FIG. 2 outwardly to its originally formed size and straightens the core cell walls, as indicated at 28 in FIG. 3. The resulting core panel 10b in FIG. 3 containing a thin core 16 is of desirable configuration, with straight distortion-free and rupture-free core cell walls.

Figure 4:
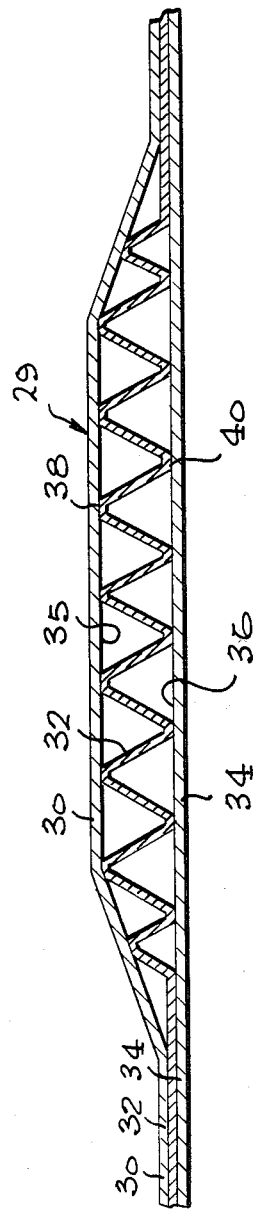
FIG. 4 illustrates the production of a truss core sandwich structure having a distortion free core, formed from three sheets of metal such as titanium alloy, according to the invention, including a thin, inner core sheet.

Referring now to FIG. 4, a truss core 29 is produced according to the invention, by subjecting an arrangement of three sheets e.g., of 6Al-4V Ti alloy, including an upper face sheet 30, a core sheet 32, and a lower face sheet 34, to diffusion bonding and superplastic forming, followed by internal pressurization during cool-down according to the invention. The core sheet 32 has a thickness of 0.030 inch or less, which would usually be distorted following superplastic forming as described above and illustrated for example in FIG. 2.

The superplastic forming and diffusion bonding operation, as well as the subsequent internal repressurization following expansion, can be carried out in an apparatus of the type described in detail in above U.S. Pat. No. 3,927,817. Such disclosure is incorporated herein by reference. An apparatus of this type is described below in connection with FIG. 5.

Figure 5:
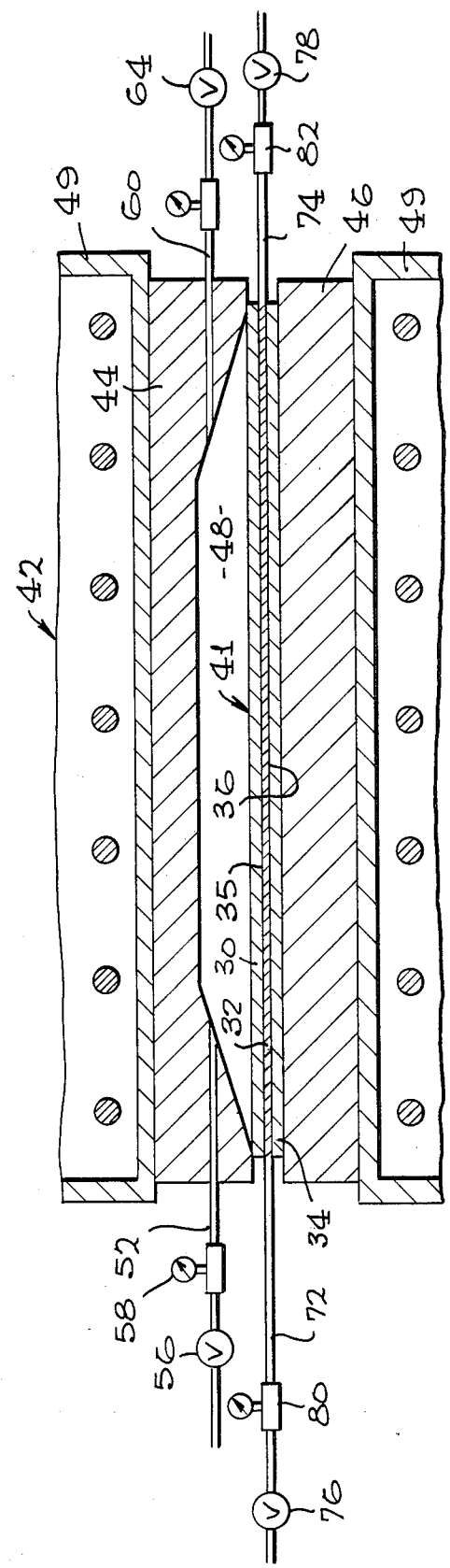
FIG. 5 is a cross-section illustrating an apparatus for carrying out the diffusion bonding, superplastic forming and internal repressurization operations according to the invention, for producing a core structure having straight non-distorted core cell walls.

Prior to insertion of the sheets 30, 32 and 34 in contact with each other, into the apparatus of FIG. 5 the sheets are first treated at selected areas 35 and 36 between the core sheet 32 and the upper and lower face sheets 30 and 34, respectively, with a stop-off material such as yttria to prevent bonding at such treated surfaces during diffusion bonding. The so treated assembly of sheets 30, 32 and 34 is then inserted into an apparatus 42, which can be employed for carrying out the diffusion bonding and the superplastic forming of the three sheets 30, 32 and 34, followed by low pressure internal pressurization or hot sizing according to the invention. The apparatus is comprised of an upper tooling frame 44 and a lower tooling frame 46, forming a chamber 48, the upper tooling member 44 being a shaping member for the configuration of the upper face sheet 30 of the truss core or sandwich structure to be formed, and illustrated in FIG. 4. Diffusion bonding between the core sheet 32 and the upper and lower face sheets 30 and 34 at the areas 38 and 40, respectively, not treated with stop-off compound is accomplished by heating the sheet assembly which is supported on the lower tooling frame 46 beneath the chamber 48 between members 44 and 46. Such heating is accomplished by heat generated from heating platens 49 for a suitable diffusion bonding temperature for the titanium alloy, which can vary from about 1450° F. to about 1850° F. e.g., about 1700° F., while subjecting the stack of sheets to a pressure which can vary from about 100 psi to about 2,000 psi or more, usually from about 150 to about 600 psi. An example of a typical diffusion bonding cycle is the use of 300 psi pressure applied for 1½ hours at 1700° F. The time for diffusion bonding can range from as little as 30 minutes to 15 hours.

Pressurization of the heated stack of sheets 30, 32, and 34 during diffusion bonding is carried out by introducing an inert gas atmosphere to chamber 48. For this purpose, a line 52 is connected to a source of pressurized gas (not shown) and to chamber 48, including a valve 56 for governing the flow of inert gas through line 52 into chamber 48 and a pressure gauge 58 to indicate pressure provided The inert gas usually employed preferably is argon in liquid form An additional line 60 is optionally provided on the opposite side of tooling frame 44 and functions as an outlet for inert gas in chamber 48. Line 60 has a valve 64 therein for regulation of inert gas flow from chamber 48. Line 60 can simply function as a vent or can be connected to a source of vacuum such as a suction pump (not shown).

When the stack of sheets 30, 32, and 34, indicated at 41 is placed in forming apparatus 42, and the stack heated at suitable bonding temperature as noted above, pressure is applied to the stack 41 by increasing the pressure in 48 by adding additional pressurized inert gas through line 52 while maintaining line 60 closed by valve 64. In this manner the stack 41 will be diffusion bonded by the application of such pressure, e.g., 300 psi for a suitable period as noted above.

For expansion and superplastic forming of the stack 41 to the configuration shown in FIG. 4, expansion tubes 72 and 74, having valves 76 and 78, and pressure gauges 80 and 82 respectively, are provided, which communicate with channels and recesses (not shown) between the three sheets 30 and 32 and 34 of the stack 41, so that inert gas will flow fairly evenly between the titanium alloy sheets.

Before superplastic forming or expanding of the stack 41 of titanium alloy sheets, the pressure in chamber 48 is reduced through lines 52 and 60.

Superplastic forming in the unbonded areas 35 and 36 of the sheets is carried out at pressure of between about 200 and 400 psi, e.g., about 300 psi, while heating the stack at temperature ranging from about 1600° to about 1700° F., e.g., about 1650° F. for 6 Al-4V titanium alloy. At superplastic forming temperature the diffusion bonded stack 41 is expanded into the shape of the truss core or sandwich structure shown in FIG. 4 by flowing pressurized inert gas through lines 72 and 74 while optimally applying a vacuum to chamber 48 through lines 52 and 60. The pressurized inert gas flows from tubes 72 and 74 into the channels and spaces (not shown) between the adjacent sheets of the diffusion bonded stack 41, and such pressurized inert gas within the stack forces the expansion of sheets 30 and 32 at the unbonded areas 35 and 36 into the truss core structure shape 29 shown in FIG. 4 within the forming chamber 48.

Following superplastic forming to produce the truss core panel 29 within the chamber 48, valves 76 and 78 are closed to shut off the flow of pressurized inert gas through tubes 72 and 74, and the gas in chamber 48 is vented through lines 52 and 60, e.g., to depressurize chamber 48 at a rate of about 4 psi per minute, and the heat from the heating platens 49 is shut off, while the tool 44, 46 is at the superplastic forming temperature of about 1600°-1650° F. During this period distortion of the thin core cell walls 32 of the truss core can occur.

When the pressure within cavity 48 has reached ambient pressure and the truss core 29 has cooled down to a temperature which is still above 1,000° F., and sufficiently high so that the thin core cell walls 32 are still flexible, usually between about 1200° and 1400° F., e.g., 1300° F. or 1400° F., for the above titanium alloy, the valves 56 and 64 in the vacuum lines 52 and 60 are shut off, and valves 76 and 78 are again opened to introduce pressurizing inert gas into the interior of the truss core 29 to a differential pressure ranging from about 3 to about 10 psi, usually about 3 to about 7 psi, to expand the panel outwardly to its original form against the bottom face of the upper tool 44 and straightening the core cell walls 32, to eliminate distortion of the thin core cell walls 32 which occurred e g., as by crushing of the truss core panel 29 during cool-down following superplastic forming. It has been found that internal repressurization or hot sizing according to the invention at differential pressures of below about 3 psi is insufficient to effectively eliminate core wall distortion and that repressurization at differential pressures between about 3 and about 7 psi will effectively alleviate such distortion and straighten the thin core cell walls 32, of about 0.030 inch thick or less. Internal pressurization up to about 10 psi may be utilized in some instances where the thickness of the core cell walls is somewhat greater than 0.030 inch, e.g., up to about 0.045 inch thick.

Internal repressurization of the truss core within the tool or die 42 can be carried out for a sufficient period of time to correct distortion of the core walls 32, e.g., about 30 minutes to about 1 hour at temperatures of between about 1300° and 1400° F. During the repressurization or hot sizing, the applied internal differential pressure within the truss 29 forces the part back up to conform to the shape of the die cavity 48 and the weight of the upper plate of the die will serve as a restraint against the applied pressure in straightening out any buckling of the core cell walls 32.

Following repressurization or hot sizing as described above, the flow of pressurization gas is ceased by closing valve 76 and 78, and the pressurization gas in cavity 48 is then vented by opening valves 56 and 64 in lines 52 and 60, to permit the pressure in chamber 48 to reduce to ambient pressure. The truss core 29 in the tool 42 is permitted to cool down to a reduced temperature, such as ambient temperature or somewhat above ambient temperature, and the truss core 29 now containing straight undistorted core cell walls 32 is removed from the tool 42.

When the same process as noted above is carried out for producing the truss core 29 by diffusion bonding and superplastic forming as described above, but without internal repressurization of the truss core following superplastic forming, the core cell walls 32 of the resulting panel are distorted due to cell wall crippling, as illustrated for example in FIG. 2 of the drawing.

From the foregoing, it is seen that the present invention provides an efficient process or means for the superplastic forming and diffusion bonding of metals such as titanium alloy, to produce core sandwich or truss core structures having thin core walls, e.g., of about 0.030 inch or less, without rupture, distortion or crippling of the cell walls. The invention process including internal pressurization during cool-down after superplastic forming, is particularly effective for core structures with thin core walls, whereas in the case of thicker core, e.g, core structures having a core wall thickness substantially greater than 0.030 inches, such core is stronger and is able to withstand the external pressures following diffusion bonding and superplastic forming, without crushing. The invention process is also effective in substantially reducing or eliminating core wall rupture as illustrated in FIG. 1 in the case of thin core walls of the thickness noted above.

Since various changes and modifications of the invention will occur to and can be made readily by those skilled in the art without departing from the invention concept, the invention is not to be taken as limited except by the scope of the appended claims.

We claim:

1. A method for eliminating core distortion in the production of core panels formed from metal workpieces of a metal capable of diffusion bonding and superplastic forming, the core of said panels being thin and subject to distortion following superplastic forming, which comprises:
    diffusion bonding said metal workpieces at preselected areas in a die,
    expanding the unbonded areas of said workpieces by superplastic forming at elevated temperature and pressure into contact with the walls of said die, and forming a core panel, and
    following release of said pressure after superplastic forming and during cooling and distortion of said panel in said die, introducing a low differential pressure into the interior of said core panel to expand said panel to its original form, said low internal differential pressure being introduced into said core panel while the metal of said panel is still at a sufficiently elevated temperature so that said metal is still flexible.

2. The method of claim 1, said metal being a titanium alloy.

3. A method for eliminating core distortion in the production of core panels having a thin core and formed from a plurality of metal workpieces of a metal capable of diffusion bonding and superplastic forming, which comprises:
    diffusion bonding said workpieces at preselected areas in a die,
    expanding the unbonded areas of said workpieces by superplastic forming at elevated temperatures and pressure into contact with the walls of said die, and forming a core panel,
    releasing said pressure and cooling said core panel, resulting in distorted core cell walls, and
    following release of said pressure and during cooling of said panel in said die, and while the metal of said panel remains at a sufficiently elevated temperature so that said metal is still flexible, introducing a low internal differential pressure into said core panel to expand said panel to its original form against the restraint of said die, and straightening the distorted core cell walls of said panel.

4. The method of claim 3, including releasing said low internal differential pressure following said expansion of said panel to its original form, and further cooling said panel.

5. The method of claim 3, the core wall thickness of said panel being about 0.030 inch or less.

6. The method of claim 5, said metal being a titanium alloy.

7. The method of claim 3, said low internal differential pressure ranging from about 3 to about 10 psi.

8. The method of claim 7, said low internal differential pressure ranging from about 3 to about 7 psi.

9. The method of claim 3, said metal panel being at a temperature of about 1000° F. or above during said introduction of said low internal pressure.

10. The method of claim 9, the temperature of said metal panel during introduction of said low internal pressure ranging from about 1200° to about 1400° F.

11. In the method for the production of a core structure having a thin core, from metal blanks of a metal by diffusion bonding and superplastic forming in a die, the core of said core structure being subject to distortion following superplastic forming, the improvement which comprises pressurizing said core structure internally with a low differential pressure after superplastic forming and during cooling of said core structure, to thereby expand said core structure into contact with said die and eliminate core distortion.

12. The improvement of claim 11, said core structure being internally pressurized by a gas at a temperature at which the metal of said core structure remains flexible to permit said expansion of said panel, and including releasing said internal pressure following said expansion, and further cooling said core structure to ambient temperature.

13. The improvement of claim 12, the core wall thickness of said core structure being about 0.030 inch or less, and said core structure being cooled to a temperature above about 1000° F. prior to pressurizing said core structure internally.

14. The improvement of claim 12, said metal being a titanium alloy.

15. The improvement of claim 13, said metal being a titanium alloy.

16. The improvement of claim 12, said metal being a titanium alloy, the core wall thickness of said core structure being about 0.030 inch or less, and said low differential pressure ranging from about 3 to about 7 psi.

17. The improvement of claim 16, said core structure being cooled to a temperature of about 1200 to about 1400° F. prior to pressurizing said core structure internally.

18. A method for eliminating core distortion in the production of a truss core panel of a titanium alloy having a core wall of a thickness of about 0.030 inch or less, by diffusion bonding and superplastic forming which comprises:
    diffusion bonding at least two sheets of a titanium alloy, at least one of said sheets having a thickness of about 0.030 inch or less, at preselected areas in a die at temperature ranging from about 1450° F. to about 1850° F. and at pressure of about 150 to about 600 psi,
    expanding the unbonded areas of said titanium alloy sheets by superplastic forming at elevated temperatures of about 1600° to about 1700° F. and at a pressure of about 200 to about 400 psi, into contact with the walls of said die and forming a truss core panel,
    releasing the pressure following superplastic forming, and cooling said truss core to a temperature of about 1200° to about 1400° F., resulting in core wall distortion, and
    introducing an inert gas at a differential pressure of about 3 to about 7 psi internally into said truss core panel to expand said panel to its original form into contact with the walls of said die, to thereby eliminate said core wall distortion of said truss core panel.

19. The method of claim 18, said truss core panel being formed from three sheets of said titanium alloy in contact with each other, the interior core sheet having a thickness of about 0.030 inch or less, 20. The method of claim 19, said cooling of said truss core panel following superplastic forming being carried out down to a temperature of about 1300° to about 1400° F., and said inert gas then being introduced internally into said truss core panel at a differential pressure of about 3 psi for about 30 minutes to about 1 hour.

21. The method of claim 18, including releasing the internal pressure in said truss core panel, and further cooling said truss core panel to about ambient temperature.

* * * * *

UNITED STATES PATENT AND TRADEMARK OFFICE
CERTIFICATE OF CORRECTION

PATENT NO. : 4,811,890
DATED : March 14, 1989
INVENTOR(S) : Charles Dowling and Roger S. Raymond It is certified that error appears in the above-identified patent and that said Letters Patent is hereby corrected as shown below:

IN THE TITLE:

Delete "UPERPLASTICALLY" and substitute -- SUPERPLASTICALLY --.

Signed and Sealed this

Twenty-sixth Day of September, 1989

Attest:

DONALD J. QUIGG

*Attesting Officer*  *Commissioner of Patents and Trademarks*